United States Patent [19]
Wakai et al.

[11] 3,742,128
[45] June 26, 1973

[54] MANUAL CHROMINANCE SATURATION CONTROL CIRCUIT

[75] Inventors: Shuzo Wakai, Kyoto; Hitoshi Sugano, Takatsuki, both of Japan

[73] Assignee: Matsushita Electronics Corporation, Osaka, Japan

[22] Filed: Feb. 25, 1972

[21] Appl. No.: 229,331

[30] Foreign Application Priority Data

Mar. 5, 1971 Japan ................................ 46/12069
Mar. 8, 1971 Japan ................................ 46/12565

[52] U.S. Cl. ......................... 178/5.4 MC, 178/5.4 R
[51] Int. Cl. ............................................ H04n 9/48
[58] Field of Search ....................... 178/DIG. 15, 26, 178/29, 5.4 AC, 5.4 SY, 5.4 MC, 5.4 CK, 5.4 R, 5.2 R; 330/30 D

[56] References Cited

UNITED STATES PATENTS 3,527,964 9/1970 Hansen et al.................. 178/5.4 HE Primary Examiner—Robert L. Richardson
Assistant Examiner—Richard D. Maxwell
Attorney—S. Delvalle Goldsmith, Lester Horwitz et al.

[57] ABSTRACT

A chrominance saturation control circuit to permit indirect or D-C mode control of chrominance saturation. The connection between the chrominance saturation control knob in a television receiver and the chrominance saturation control circuit can be achieved through wiring which transmits only D-C voltage. With this DC controlled chrominance saturation control, the television set may be made less susceptible to external interference compared to the case of using a shielded wiring for directly controlling the chrominance saturation.

3 Claims, 1 Drawing Figure

PATENTED JUN 26 1973 3,742,128
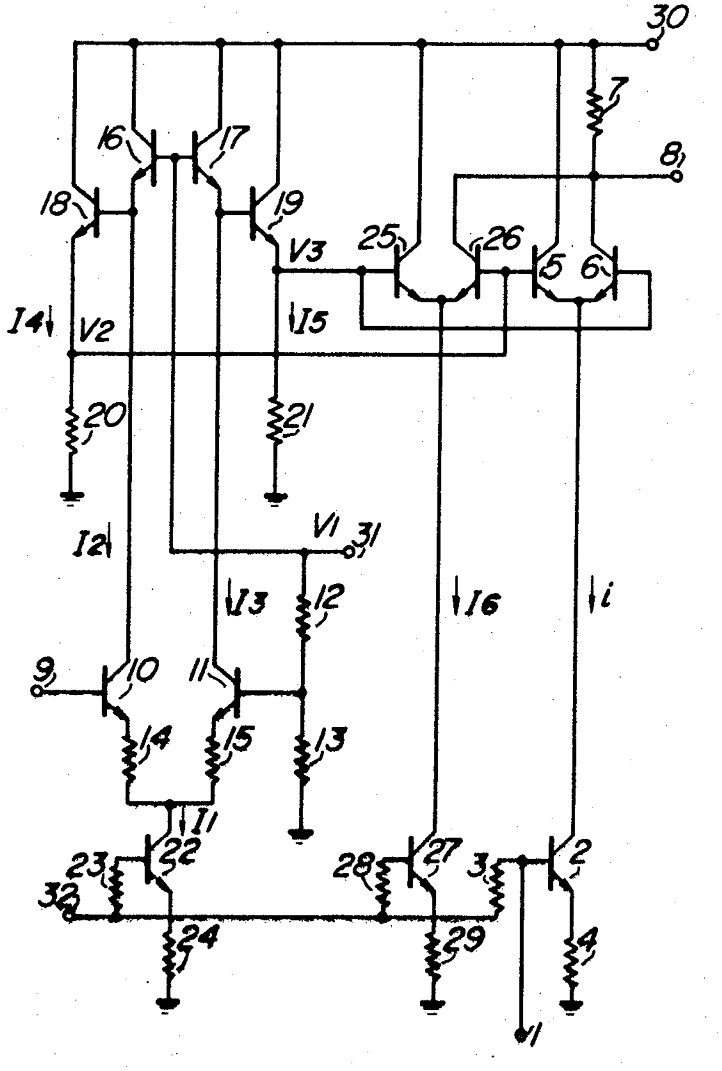

MANUAL CHROMINANCE SATURATION CONTROL CIRCUIT

This invention relates to chrominance saturation control circuits for color television receivers and, more particularly, to chrominance saturation control circuits suited to be fabricated as semiconductor integrated circuits.

In color television receivers, the function of controlling the saturation of a chrominance signal is necessary, and this function is provided by a chrominance saturation control circuit. The usual chrominance saturation control circuit includes a variable resistor which is inserted in the transmission path for the chrominance signal and is adjustable to control the amplitude thereof.

The chrominance saturation must be controllable by manipulating a control knob provided at the front of television set.

In the usual color television set, the aforementioned variable resistor for chrominance saturation control is coupled to a color control knob at the front of the set so that it is directly adjusted to control the chrominance saturation. In this arrangement, however, it is essential that the variable resistor provided in the transmission path for the chrominance signal be located adjacent to the front of the color television set which is fairly distant from the circuitry constituting a major portion of the chrominance signal transmission path. Therefore, the color control knob and the remote circuitry should be connected by using a shielded wire in order to avoid external interference and interference stemming from the connection wire itself.

With the above shielded wire, however, the aforesaid said interference cannot be completely eliminated.

An object of the invention is to overcome the above drawbacks inherent in the conventional chrominance saturation control circuit by the provision of a novel chrominance saturation control circuit which permits indirect or DC mode control of the chrominance saturation.

In order for the invention to be fully understood, it will now be described in connection with the accompanying drawing, in which a sole FIGURE illustrates a chrominance saturation control circuit embodying the invention.

Referring to the drawing, reference numeral 1 designates a chrominance signal input terminal, numeral 2 an amplifier transistor to amplify the chrominance signal input, numerals 3 and 4 base bias resistor and emitter resistor for the transistor 2 respectively, numerals 5 and 6 transistors constituting a chrominance saturation control differential amplifier, numeral 7 an output load resistor, numeral 8 a chrominance signal output terminal, numeral 9 a chrominance saturation control DC voltage supply terminal, numerals 10 and 11 transistors constituting a differential amplifier to amplify the chrominance saturation control voltage, numerals 12 and 13 resistors constituting a voltage divider to provide a base bias voltage to the transistor 11, numerals 14 and 15 emitter resistors for the respective transistors 10 and 11, numerals 16 and 17 transistors for converting currents flowing in the collector of the respective transistors 10 and 11 into corresponding voltages, numerals 18 and 19 emitter-follower transistors, numerals 20 and 21 emitter resistors for the respective transistors 18 and 19, numeral 22 a transistor constituting a constant current circuit, numerals 23 and 24 base bias resistor and emitter resistor for the transistor 22, numerals 25 and 26 transistors constituting a differential amplifier for suppressing the DC level fluctuation at the chrominance signal output terminal 8, numeral 27 a transistor forming a constant current circuit for the last mentioned differential amplifier, numerals 28 and 29 base bias resistor and emitter resistor for the transistor 27, and numerals 30, 31 and 32 DC bias supply terminals.

To described the operation of the circuit for the above construction, it is now assumed that a chrominance signal input (chrominance subcarrier wave) prevails at the terminal 1. In this state, when the chrominance saturation control DC voltage at the terminal 9 is zero volt, the transistor 10 is "off" and transistor 10 carries current. In this case, relations $I_2 = 0$ and $I_3 = I_1$ hold, wherein $I_2$ is the collector current in the transistor 10, $I_3$ is the collector current in the transistor 11, and $I_1$ is the collector current in the transistor 22.

Meanwhile, the emitter voltage $V_2$ on the transistor 18 and the emitter voltage $V_3$ on the transistor 19 can be expressed as $$V_2 = V_1 - V_{BE_{I2}} - V_{BE_{I4}} \quad (1)$$

and $$V_3 = V_1 - V_{BE_{I3}} - V_{BE_{I5}} \quad (2)$$

where $V_1$ is the voltage at the terminal 31 and $V_{BE_{I2}}$, $V_{BE_{I4}}$, $V_{BE_{I3}}$, and $V_{BE_{I5}}$ are forward voltage drops across the base-to emitter junction of the respective transistors 16, 19, 17 and 18 when their individual emitter currents are $I_2$, $I_4$, $I_3$ and $I_5$ respectively.

If the $V_{BE}$ for all the above transistors are equal and the resistors 20 and 21 have an equal resistance, $V_{BE_{I4}}$ and $V_{BE_{I5}}$ are substantially equal and the voltages $V_2$ and $V_3$ depend upon the currents $I_2$ and $I_3$.

With these voltages $V_2$ and $V_3$ applied to the base of the respective transistors 5 and 6, chrominance subcarrier current $i$ which is based upon the chrominance signal at the terminal 1 flows through both the transistors 5 and 6 in proportions according to the current ratio between $I_2$ and $I_3$.

When the afore-mentioned relations $I_2 = 0$ and $I_3 = I_1$ prevail, therefore, the chrominance subcarrier current $i$ entirely flows through the transistor 5, so that no output signal appears at the output terminal 8.

When the voltage on the terminal 9 becomes equal to the base bias voltage on the transistor 11, the currents $I_2$ and $I_3$ become equal so that the chrominance subcarrier signal $i$ flows through the transistors 5 and 6 in equal proportions. Thus, the output at the terminal 8 becomes equal to one half the input.

When the voltage on the terminal 9 becomes substantially equal to the voltage on the terminal 31, the transistor 10 is triggered and transistor 11 is cut off to establish relations $I_2 = I_1$ and $I_3 = 0$, so that the chrominance subcarrier current $i$ entirely flows through the transistor 6 and full output appears at the terminal 8.

The differential amplifier constituted by the transistors 25 and 26 does not have direct bearing upon the end of the chrominance saturation control. If this amplifier is not provided, however, the DC level of the output at the output terminal is prone to fluctuations according to chrominance control, which is extremely inconvenience in practice. Such DC level fluctuations can be suppressed by the above differential amplifier.

To describe this respect in more detail, while the voltages on the emitters of the transistor 18 and 19 are supplied differentially to the differential amplifier of the transistors 25 and 26, the voltage on the emitter of the transistor 18 is impressed upon the base of the transistor 26 whose collector is connected to the collector of the transistor 6. Accordingly, the DC current flowing in the transistor 26 is affected by the current $I_2$, while the DC component of chrominance subcarrier current branching into the transistor 6 is affected by the current $I_3$. In other words, the former is opposite in character to the latter, so that the former current, i.e., DC current flowing in the transistor 26, is cancelled by the latter current, i.e., DC component in the chrominance subcarrier current, whereby fluctuations of the DC level of the output can be suppressed.

As has been made apparent from the foregoing, with the chrominance saturation control circuit according to the invention it is possible to achieve indirect control of the chrominance saturation by the DC voltage added to the terminal 9.

In actually incorporating the illustrated circuit into a television receiving set, the circuit itself may be disposed in the neighborhood of the signal transmission circuit and only a voltage generating section that generates the DC voltage to be added to the terminal 9 may be provided at the front of the set. Thus, the connection between the color control knob provided at the front of the set and the remote circuitry may be achieved through a simple wiring, which is required to transmit only DC voltage. This permits manufacturing a color television set less susceptible to interference compared to the conventional sets.

Further, by connecting a suitable capacitor to the terminal 9 it is possible to readily and completely remove any disturbing signal that might be introduced into the DC voltage.

Furthermore, since the circuit according to the invention consists of transistors and resistors alone, it is very convenient in view of fabricating semiconductor integrated circuits. Moreover, the circuit according to the invention may be used not only for the chrominance saturation control in color television sets but it can also find extensive applications as a DC controllable variable impedance circuit.

What we claim is:

1. A chrominance saturation control circuit comprising a first differential amplifier having two transistors, a chrominance saturation control DC voltage being coupled to the base of one of said transistors, two current-to-voltage converting transistors connected to the respective collectors of said first-mentioned transistors of said first differential amplifier, two emitter-follower transistors connected to the respective emitters of said converting transistors, and a second differential amplifier having two transistors, the voltages on the emitters of said two emitter-follower transistors being differentially coupled to said second differential amplifier, a chrominance signal being coupled to the emitter of the two transistors forming said second differential amplifier, the collector of one of said two transistors forming said second differential amplifier being connected to an output terminal, a chrominance signal output appearing at said output terminal being controlled by said DC voltage coupled to said first differential amplifier.

2. The chrominance saturation control circuit according to claim 1, which further comprises a third differential amplifier, the voltages on the emitters of said two emitter-follower transistors being also differentially coupled to said third differential amplifier, DC current flowing in said third differential amplifier being adapted to cancel DC components in the chrominance signal output.

3. The chrominance saturation control circuit according to claim 1, which further comprises a transistor forming a constant current circuit for said third differential amplifier, a chrominance signal input being coupled to the base of said constant current circuit transistor.

* * * * *